May 11, 1948. J. E. SHAFER 2,441,294
BEARING ASSEMBLY
Filed Jan. 1, 1945
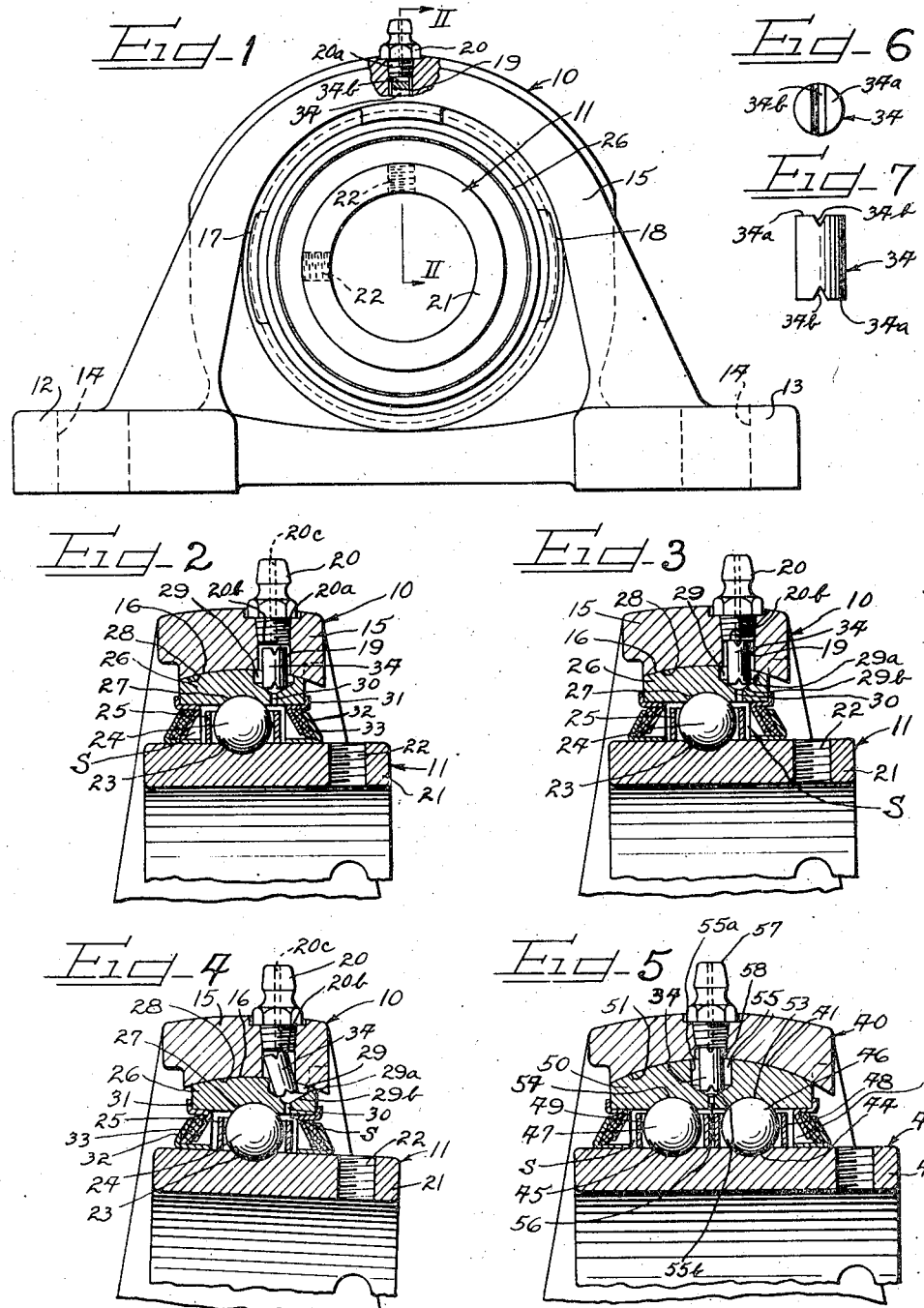
Inventor
Julius E. Shafer
by The Firm of Charles H. Hill
Attys.

Patented May 11, 1948

2,441,294

UNITED STATES PATENT OFFICE 2,441,294

BEARING ASSEMBLY

Julius E. Shafer, Chicago, Ill.

Application January 1, 1945, Serial No. 570,845

4 Claims. (Cl. 308—72)

This invention relates to bearing assemblies including bearing units locked in housings with inexpensive devices that always accommodate flow of lubricant to the bearing units.

Specifically this invention relates to a pillow block and sealed bearing unit assembly held together for limited relative movement by an inexpensive locking pin having notches in the ends thereof to accommodate lubricant flow under all conditions.

In accordance with this invention a housing, such as a pillow block, for a bearing, such as a sealed ball bearing, has a bore extending therethrough for registration with a closed perimeter dimple or depression formed in the outer race ring of the bearing unit and communicating with the sealed interior of the unit. A locking pin is seated in the dimple and projects into the bore of the housing. A lubricant fitting is secured in the bore of the housing preferably in spaced relation from the locking pin. In some instances, however, the lubricant fitting may engage the locking pin and interfere with flow of lubricant from the fitting around the locking pin into the dimple. The present invention eliminates any possibility for stoppage of lubricant flow to the interior of the bearing without increasing the cost of the locking pin.

Thus, the present invention utilizes an inexpensive locking pin composed of a solid rod with notches or slots in the ends thereof. These slots serve as lubricant passages even when the ends of the locking pin are firmly seated against the lubricant fitting and against the wall of the dimple.

The locking pin has an outside diameter smaller than the diameter of the bore and the diameter of the dimple, so that lubricant can flow from the lubricant fitting through the slot in one end of the pin, thence around the pin through the bore of the housing into the dimple and then through the slot at the other end of the pin for flow through the passage connecting the dimple with the interior of the bearing unit.

A feature of this invention therefore resides in the provision of an inexpensive solid locking pin which insures flow of lubricant to a bearing unit from a housing while holding the unit in the housing.

An object of the invention is to provide a bearing assembly having a bearing unit locked for limited universal movement in a housing by a device which insures flow of lubricant from a lubricant fitting to the interior of the bearing unit.

A still further object of the invention is to provide a solid locking pin for a sealed bearing unit and housing assembly with notches at the ends thereof to insure free flow of lubricant even when the ends of the pin are fully seated.

A still further object of the invention is to provide a bearing unit and housing assembly wherein the bearing unit is locked for limited universal movement in the housing by a solid cylindrical pin seated in a dimple provided in the unit and projecting loosely into a bore provided in the housing and having slots in the ends thereof to accommodate passage of lubricant even when the end faces of the pins are tightly seated in the dimple and against a lubricant fitting.

Other and further objects of the invention will be apparent to those skilled in the art from the following detailed description of the annexed sheet of drawings which, by way of preferred examples only, illustrate two embodiments of the invention.

On the drawings:

Figure 1 is a side elevational view of a sealed bearing unit mounted in a one-piece pillow block, a portion of which is broken away and shown in vertical cross section to illustrate the locking pin arrangement of this invention.

Figure 2 is a vertical cross-sectional view taken along the line II—II of Figure 1.

Figure 3 is a view similar to Figure 2 but illustrating the locking pin with its end faces tightly engaged.

Figure 4 is a view similar to Figures 2 and 3 but illustrating the bearing unit in tilted position to show how the locking pin can tilt even when engaged at its ends as in Figure 3.

Figure 5 is a view similar to Figure 3 but illustrating a bearing unit having a double row of balls.

Figure 6 is an enlarged plan view of the locking pin shown in Figures 1 to 5.

Figure 7 is an enlarged elevational view of the locking pin.

As shown on the drawings:

In Figures 1 to 4 inclusive the reference numeral 10 designates generally a one-piece pillow block having a sealed bearing unit 11 mounted therein. As shown in Figure 1, the pillow block 10 has feet 12 and 13 with holes or slots 14 therethrough for receiving bolts or other mounting devices (not shown) to rigidly secure the pillow block to a supporting structure (not shown). The pillow block has an annular strap portion 15 formed intermediate the feet 12 and 13 and provided with a concave inner face 16 as best shown in Figures 2 to 4. This inner face 16 forms a tilting bearing wall for the bearing unit 11.

Slots or grooves 17 and 18 (Figure 1) are formed in the strap portion 15 on the inner wall 16 thereof to permit horizontal insertion of the bearing unit 11 into the pillow block. The bearing 11 when thus inserted in the slots 17 and 18 can be rotated to a vertical position to be seated on the inner face 16 of the strap 15.

The top of the strap 15 has a radial bore 19 therethrough receiving a lubricant fitting 20 in threaded relation therein. The lubricant fitting 20 thus has a threaded nipple portion 20a with a flat end face 20 disposed in the outer end of the bore 19. The fitting 20 has a lubricant-conveying bore or passageway 20c extending axially therethrough and terminating in the end face 20b.

The bearing unit 11 includes an inner race ring 21 adapted to be disposed around a shaft or other rotating member (not shown). This race ring 21 has one or more threaded radial holes 22 therethrough for receiving set screws to fixedly secure the ring to the inserted shaft or other rotating member for co-rotation therewith.

A circumferential groove 23 is formed around the ring 21 to provide a raceway for a row of ball bearings 24. The ball bearings 24 are held in spaced relation around the ring 21 in the raceway 23 by a cage 25.

The bearing unit 11 also has an outer race ring 26 in spaced concentric relation around the inner race ring 21. The outer ring 26 has a groove 27 therein providing an outer raceway for the ball bearings 24. The ball bearings 24 thus hold the inner and outer rings 21 and 26 respectively in spaced concentric relation. The periphery of the outer race ring 26 has a convex surface 28 for seating on the concave inner face 16 of the strap 15. The two contacting faces 16 and 28 cooperate to tiltably mount the bearing unit 11 in the pillow block 10 while retaining the unit in the pillow block until the bearing unit 11 is tilted so that the race ring 26 can be withdrawn from the pillow block 10 through the slots 17 and 18.

A well or closed-perimeter dimple 29 is formed in the outer race ring 26 in such a position as to be aligned with the bore 19 when the bearing unit 11 is in upright position in the pillow block as shown in Figures 2 and 3. This dimple 29 has a straight cylindrical upstanding wall portion 29a with a tapered bottom wall 29b converging from the cylindrical wall 29a to a small diameter bore 30 connecting the bottom of the dimple with the space S between the race rings 21 and 26. The angle of taper of the bottom wall 29b is such that it will accommodate tilting movements of a flat-ended member thereon.

The space S is sealed at each end by retainers 31 pressed into the outer ends of the outer race ring 26 and by flingers 32 pressed onto the inner race ring 21. Felt seals 33 are disposed between the flingers and retainers for sealing cooperation therewith.

A solid cylindrical locking pin 34 of smaller diameter than the bore 19 and the cylindrical portion 29a of the dimple 29 is seated on the bottom wall 29b of the dimple and projects freely into the bore 19 of the housing. The locking pin 34, as best shown in Figures 6 and 7, has flat end faces 34a with V-shaped slots 34b extending diametrically thereacross. These slots 34b extend inwardly from the end faces 34a for a sufficient distance to provide ample passageways for free flow of lubricant even when the end faces are respectively engaged by the end 20b of the lubricant fitting and the bottom wall 29b of the dimple as shown in Figure 3.

The locking pins 34 of this invention are inexpensively formed by cutting a clylindrical rod and the cutter can be equipped with die faces which form the slots during the cutting operation. In effect, the pins 34 are merely chopped from a cylindrical solid rod.

It is desirable to have the pin 34 spaced from the end face 20b of the lubricant fitting 20 as shown in Figure 2, so that the pin floats freely in the bore 19 and in the dimple 29. However, wide tolerance limits are permissible in accordance with this invention, without interfering with lubricant flow from the fitting 20 to the space S. Thus, even if the locking pin 34 is in tight engagement with the end face 20b of the lubricant fitting 20 as shown in Figure 3, and is forced by the fitting 20 tightly against the bottom wall 29b of the dimple, the slots 34a still provide for free flow of lubricant from the passage 20c to the bore 19 and from the bore 19 through the dimple 29 to the bore 30.

As illustrated in Figure 4, the loose pin 34 of Figure 2 as well as the tightly held pin 34 of Figure 3 can readily tilt in the bore 19 and in the dimple 29 to permit cocking of the bearing unit 11 relative to the housing 10. This permissible tilting or cocking of the bearing 11 in the housing 10 provides a self-aligning bearing assembly. The slope of the bottom wall 29b of the dimple is such that the pin 34 can rock relative to the dimple even when its opposed face is fully seated on the end face 20b of the lubricant fitting. Thus as illustrated in Figure 4, the tilting of the unit 11 tilts part of the bottom wall 29b of the dimple away from the bottom wall of the pin 34 thereby permitting the pin to slide down further into the dimple so that it can rock relative to the bottom face 20b of the fitting. The oversized bore 19, of course, permits sidewise movement of the pin and increased tilting movements of the bearing 11.

The bearing 11 can thus tilt through a sufficeintly wide range to provide a self-aligning assembly while the pin 34 holds the outer race ring 26 against rotation in the strap portion 15 of the pillow block. Because the surfaces 16 and 28 are held against rotation by the pin 34, these surfaces will not be subjected to excessive wear conditions. The pin maintains the dimple 29 always in communication with the bore 19, so that lubricant can flow from the fitting into the space S of the sealed bearing.

The bearing 11 is easily removed from the pillow block 10 by unscrewing the lubricant fitting 20, removing the pin 34, tilting the unit 11 at right angles to the strap 15 and withdrawing the unit 11 through the slots 17 and 18.

A modified bearing assembly is shown in Figure 5 wherein a pillow block 40 has a concave inner wall tiltably supporting a sealed bearing unit 42. This unit 42 includes an inner race ring 43 with two spaced circumferential grooves 44 and 45 therearound. Each of these grooves 44 and 45 provide a raceway for a separate row of ball bearings 46 and 47. The ball bearings are held in spaced relation by separate cages 48 and 49. The cages 48 and 49 are in spaced opposed relationship.

The bearing unit 42 has an outer race ring 50 with a convex outer surface 51 in tilting engagement on the concave wall 41 of the pillow block.

This outer race ring 50 has grooves 53 and 54 forming raceways for the ball bearings 46 and 47 and opposing the grooves 44 and 45. The rings 43 and 50 are thus held in spaced concentric relation.

The outer race ring 51 has a dimple 55 midway between the side faces thereof and, since the race ring 50 is thickest at this central portion, this dimple 55 has a longer cylindrical wall portion 55a than the wall portion 29a of the dimple 29. The dimple 29 is in a thin part of the race ring 26 close to a side face of the ring.

The dimple 55 has a tapered bottom wall 55b converging to a small diameter bore 56 communicating with the central portion of a space S between the race rings 43 and 50. This space S is sealed with the same type of flingers, retainers, and seal rings described in connection with Figures 2 to 4. A lubricant fitting 57 is threaded into a radial bore 58 in the top of the pillow block 50 and a locking pin 34 is seated freely in the dimple 55 on the bottom wall 55b thereof and projects freely into the bore 58 under the lubricant fitting 56. The locking pin 34 acts in the dimple 55 and bore 58 in the identical manner described in connection with Figures 2 to 4.

The bores 30 or 56 connecting the bottoms of the dimples with the sealed chambers S of the bearing units 11 or 42 are so positioned that the ball bearings do not roll over the mouths of the bores. Thus in the unit of Figures 2 to 4, the bore 30 is spaced to one side of the row of ball bearings 24, while in the unit of Figure 5 the bore 56 is between the twin rows of balls 46 and 47.

From the above descriptions it will be understood that this invention now provides an inexpensive locking pin for a housing and bearing unit assembly whereby the outer race ring of the bearing unit is held against rotation in the housing but permits limited tilting movements of the unit. Lubrication of the anti-friction bearings in the bearing chamber of the unit is always insured even when a lubricant fitting on the housing tightly engages the locking pin.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a bearing assembly including a housing having an inner bearing wall and a bearing unit having an outer bearing wall for seating on said inner bearing wall of the housing, said housing having a large bore therethrough, said outer wall of the bearing unit having a closed-perimeter dimple therein with a small bore extending from the dimple to join the dimple with the interior of the bearing unit, and a lubricant fitting secured in the outer end of said large bore in said housing, the improvement which comprises a solid locking pin bottomed in said dimple and projecting freely therefrom into loose wobbling relation with the bore of the housing, said pin having a smaller cross-sectional area than said bore of the housing and said dimple but larger than the cross-sectional area of said small bore, said locking pin having slotted ends accommodating flow of lubricant from the lubricant fitting around the pin through said large bore into the dimple and then through the small bore into the interior of the bearing unit even when the ends of the locking pin are seated against the bottom of the dimple and the end of the lubricant fitting.

2. A bearing assembly comprising a housing with a one-piece interior wall accommodating tilting movements and having a bore connecting the wall with the exterior of the housing, a sealed bearing unit having an outer race ring with an exterior wall for seating on the interior wall of the housing in tiltable relation therewith, said outer race ring of the sealed bearing unit having a closed-perimeter dimple therein with an upstanding cylindrical wall of a larger diameter than said bore in the housing and a tapered bottom wall converging to a central point at an angle accommodating tilting movements, said outer race ring having a small diameter bore connecting the converging point of said tapered bottom wall of the dimple with the interior of the sealed bearing unit, a lubricant fitting threaded into the outer end of said bore in said housing and terminating in spaced relation from said interior wall of the housing, and a solid cylindrical rod bottomed on the tapered wall of said dimple and projecting therefrom into said bore of the housing, said rod having a diameter appreciably less than the diameter of said upstanding cylindrical wall of the dimple and appreciably less than the diameter of said bore in the housing to accommodate substantial wobbling movement of the rod in the dimple and bore, said cylindrical rod having flat end faces with V-shaped slots extending thereacross whereby one flat end face can be engaged by the end of the lubricant fitting while the other flat end face can be bottomed on said tapered wall of the dimple while said slots accommodate free flow of lubricant from the lubricant fitting around the pin through the small bore into the interior of the bearing unit.

3. In a bearing assembly including a pillow block having a one-piece strap portion with a concave inner face accommodating tilting movements and a radial bore therethrough, a sealed bearing unit having an outer race ring with a convex surface tiltably mounted on said concave face of the strap portion, said outer race ring having a closed perimeter circular dimple with a tapered bottom wall and a small bore extending from the central portion of said tapered bottom wall to connect the dimple with the interior of the bearing unit, and a lubricant fitting threaded in the outer end portion of said radial bore of the housing, the improvement of a solid cylindrical metal rod locking said bearing unit and said housing for limited relative movement, said rod having flat end faces with transverse slots therein, one of said end faces adapted to seat on the tapered bottom wall of the dimple in tiltable relation, the other of said end faces adapted to engage the lubricant fitting, and said rod having a diameter materially less than the radial bore and materially less than the dimple whereby the rod can freely wobble to permit an increased amount of relative movement between the pillow block and bearing unit.

4. A pillow block and bearing unit assembly which comprises a pillow block having a one-piece strap portion with a concave inner face accommodating tilting movements, a sealed bearing unit having inner and outer race rings with a double row of ball bearings holding said race rings in spaced concentric relation, said outer race ring having a convex wall seated in tiltable relation on said concave inner face of the strap portion, said strap portion having a straight cylindrical bore therethrough, said outer race ring having a closed-perimeter dimple therein with a tapered bottom wall and a small bore connecting the interior of the dimple with the interior of the bearing unit between said double row of ball bearings, a lubricant fitting threaded in said cylindrical bore of the strap portion and having an end face terminating in spaced relation outwardly from the inner concave face of the strap portion, a solid cylindrical rod of smaller diameter than said bore in the strap portion and said dimple but larger than said small bore and having a first slotted end face bottomed on said tapered wall of the dimple, said rod projecting freely from said dimple into said cylindrical bore of the strap portion and having a second flat slotted end face adjacent said end face of the lubricant fitting, and said second end face adapted to engage the lubricant fitting whereupon said slots will accommodate free flow of lubricant.

JULIUS E. SHAFER.

REFERENCES CITED

The following references are of record in the file of this patent:

UNITED STATES PATENTS

| Number | Name | Date |
|---|---|---|
| 687,676 | Culver | Nov. 26, 1901 |
| 2,080,370 | Hauk | May 11, 1937 |
| 2,290,213 | Shafer | July 21, 1942 |